United States Patent [19]
MacKenzie

[11] Patent Number: 6,049,282
[45] Date of Patent: *Apr. 11, 2000

[54] METHOD AND APPARATUS FOR MEASURING ICE THICKNESS ON SUBSTRATES USING BACKSCATTERING OF GAMMA RAYS

[75] Inventor: Innes K. MacKenzie, Guelph, Canada

[73] Assignee: University of Guelph, Guelph, Canada

[*] Notice: This patent is subject to a terminal disclaimer.

[21] Appl. No.: 09/166,720

[22] Filed: Oct. 5, 1998

Related U.S. Application Data

[63] Continuation-in-part of application No. 08/901,882, Jul. 29, 1997, Pat. No. 5,821,862, which is a continuation-in-part of application No. 08/521,020, Aug. 30, 1995, abandoned.

[30] Foreign Application Priority Data

Aug. 30, 1994 [GB] United Kingdom .................. 9417419

[51] Int. Cl.[7] .................................................. G08B 19/02
[52] U.S. Cl. .................. 340/583; 340/580; 250/320.09; 378/89; 702/137; 702/172
[58] Field of Search .................................... 340/583, 962, 340/580, 600; 250/320.09; 378/89, 90; 702/137, 172; 73/590; 62/140; 244/134 F

[56] References Cited

U.S. PATENT DOCUMENTS

| | | | |
|---|---|---|---|
| 3,914,607 | 10/1975 | Cho et al. | 378/89 |
| 4,047,029 | 9/1977 | Allport | 378/90 |
| 4,054,255 | 10/1977 | Magenheim | 244/134 F |
| 4,593,533 | 6/1986 | Alsenz | 62/140 |
| 4,628,736 | 12/1986 | Kirby et al. | 73/590 |
| 4,646,068 | 2/1987 | Skala | 340/580 |
| 4,688,185 | 8/1987 | Magenheim et al. | 702/172 |
| 4,701,868 | 10/1987 | Regimand | 702/137 |
| 4,797,660 | 1/1989 | Rein, Jr. | 340/583 |
| 4,851,817 | 7/1989 | Brossia et al. | 340/583 |
| 5,014,042 | 5/1991 | Michoud et al. | 340/583 |
| 5,195,117 | 3/1993 | Ong | 378/89 |
| 5,296,853 | 3/1994 | Federov et al. | 340/962 |
| 5,351,689 | 10/1994 | MacKenzie | 600/436 |
| 5,446,288 | 8/1995 | Tumer | 250/390.05 |
| 5,557,108 | 9/1996 | Tumer | 250/390.04 |
| 5,821,862 | 10/1998 | MacKenzie | 340/583 |

FOREIGN PATENT DOCUMENTS 1385279  12/1972  United Kingdom .

Primary Examiner—Benjamin C. Lee
Attorney, Agent, or Firm—Lynn C. Schumacher; Nancy E. Hill

[57] ABSTRACT

The present invention provides a method and apparatus for in situ measuring thicknesses of ice buildup on airfoil. The method and device uses a probe including a radioactive $^{241}$Am gamma ray source producing 60 keV gamma ray photons which penetrate through the airfoil substrate and a photodetector mounted behind the source for detection of backscattered gamma rays. The probe is mounted on the interior of the airfoil and secondary radiation is backscattered within the ice layer and back through the airfoil substrate to the photodetector. The shape and density of the source holder in addition to the geometrical arrangement of the source and detector with respect to the airfoil substrate are used to block a substantial fraction of gamma rays backscattered in the airfoil substrate thereby favoring scattering in the ice layer over that in the airfoil material.

24 Claims, 6 Drawing Sheets

METHOD AND APPARATUS FOR MEASURING ICE THICKNESS ON SUBSTRATES USING BACKSCATTERING OF GAMMA RAYS

CROSS REFERENCE TO RELATED U.S. PATENT APPLICATION

This patent application is a continuation-in-part patent application of U.S. patent application Ser. No. 08/901,882 filed on Jul. 29, 1997 entitled METHOD AND APPARATUS FOR MEASURING ICE THICKNESS ON SUBSTRATES USING BACKSCATTERING OF GAMMA RAYS, now U.S. Pat. No. 5,821,862, which in turn is a continuation-in-part of application No. 08/521,020 filed Aug. 30, 1995, now abandoned.

FIELD OF THE INVENTION

The present invention relates to an in situ method and device for measuring the thickness of ice layers on substrates using backscattering of gamma rays.

BACKGROUND OF THE INVENTION

The ability to measure, nondestructively and in situ the thickness of growing thin films is very advantageous in many industrial applications. For example, of paramount importance to passenger safety is the ability to monitor in situ growth of ice coatings on aircraft. Buildup of ice layers on aircraft wings or other materials has been and continues to be a cause of aircraft disasters. During or after takeoff of the aircraft the added weight of the ice, which can be very significant, as well as the accompanying change in aerodynamic flow patterns over the airflow surfaces can cause crashes. Preventative procedures such as de-icing the aircraft typically are carried out when the aircraft is near the hangar after which the aircraft taxis to the end of the runway for takeoff. During this period ice can again build up on the aircraft depending on the distance the aircraft must taxi and the severity of the weather conditions.

One current method of measuring ice thickness on an airfoil uses microwave electromagnetic radiation. The microwave radiation is used to monitor the thickness and dielectric constant of the growing layer from which the composition is calculated. U.S. Pat. Nos. Pat. Nos. 4,054,255 and 4,688,185 issued to Magenheim and Magenheim et al. respectively disclose using a dielectric layer affixed to the wing surface as a surface waveguide into which a low power microwave signal is directed. The impedance and reflection properties of the waveguide change as ice builds up on the waveguide and this change is measured and related to the buildup of ice.

Drawbacks to microwave monitoring systems are the expense of the power supplies and the need for sophisticated software for handling the data. Microwave monitoring systems necessitate cutting holes in the airfoils of the aircraft or otherwise modifying the structure to include waveguide elements which increase installation costs, disturb the flow pattern over the airfoil and may reduce structural strength.

Another known method for monitoring ice build-up involves the use of internal reflection to measure ice thickness. U.S. Pat. No. 4,797,660 issued to Rein Jr. teaches use of internal reflection of EM using a prism mounted to the wing surface. A light source and detector are positioned to cause light to impinge on the exposed surface of the prism and a detector measures internally reflected light from the exposed surface with the reflected intensity being a function of the buildup on the exposed prism surface. U.S. Pat. No. 5,296,853 issued to Federow et al. is directed to a laser ice detector comprising a light source, light detector and temperature sensor with the light source and detector embedded in a plastic housing mounted flush with the surface of the wing. The system is designed to give total internal reflection when ice is absent from the plastic surface. The presence of ice on the plastic is accompanied by loss of total internal reflection.

U.S. Pat. No. 4,797,660 issued to Michoud et al. discloses an ice thickness measuring technique for aircraft using internal reflection of light. The device is designed to discriminate against water and ice with for example falling rain acting to modulate the light signal received by the detector in a characteristic manner thereby distinguishing it from the signal due to ice buildup. As with microwave techniques, a drawback to internal reflection is the need for modification of the airfoil surface.

Patent No. GB 1385279 discloses a device for detecting ice on the surface of an aircraft including a radioactive source producing gamma rays or beta rays (fast electrons) and a pair of Geiger-Muller detectors located laterally of the radiation source with one detector on each side of the source. This device has several disadvantages. The radiation detector must operate under very cold conditions and since Geiger-Muller counters are known to be very inefficient detectors of 60 keV gamma rays, the radiation sources must have a very high strength. Further, there is nothing in the design of the ice measuring device which makes the system more sensitive to scattering in an ice layer as opposed to scattering in the air-foil material.

A rapid and accurate method of measuring the build-up of ice on aircraft in flight is required for safety considerations. Ice build-up occurs predominantly on the ground and at low altitudes with little build-up occurring at normally high cruising altitudes for jet aircraft. However, the steady increase in air traffic unaccompanied by construction of more airports has resulted in the practice of "stacking up" low priority flights before giving clearance to land. This is particularly the case in inclement weather and at relatively low altitudes, conditions most conducive to icing. Therefore, there is a need for a rapid, accurate, economic, in situ and nondestructive method of measuring the thickness of growing films on substrates.

SUMMARY OF THE INVENTION

An object of the present invention is to provide a rapid, economical method for measuring ice buildup on an airfoil that avoids the need for perforating the airfoil or mounting devices on the airfoil surface.

The present invention provides a method for measuring ice buildup on an outer surface of a substrate comprising providing a gamma ray source in a source holder, the gamma ray source producing a beam of primary gamma rays having sufficient energy to penetrate through the substrate. A photodetection means is located behind the source holder and the source holder is positioned adjacent to an inner surface of the substrate so that the beam of primary gamma rays are directed through the substrate away from the photodetection means, wherein the source holder shields the photodetection means from primary gamma rays from the gamma ray source and shields the photodetection means from at least some of the gamma rays scattered in the substrate. The method includes measuring an intensity of gamma rays at the photodetection means and determining from the intensity of gamma rays a thickness of ice buildup on the outer surface of the substrate.

In this aspect of the invention the step of determining a thickness of ice buildup may include measuring a background intensity of gamma rays measured by the photodetection means from an ice-free substrate and subtracting the background intensity from the measured intensity of gamma rays.

In another aspect of the invention there is provided an apparatus for measuring ice layer buildup on an outer surface of an airfoil, comprising:

at least one probe mounted on an interior surface of said airfoil, each probe including a source holder containing a source of gamma rays having energies sufficiently high to penetrate through said airfoil, a photodetection means located behind the source holder for measuring an intensity of backscattered photons, the photodetection means being positioned with respect to the source holder so that said source holder blocks primary gamma rays from the source impinging on the photodetection means and shields said photodetection means from at least some secondary gamma rays backscattered in said airfoil, and wherein gamma rays emerging from said source holder are directed away from said photodetection means; and processing means connected to the photodetection means for calculating a thickness of the ice layer from the intensity of backscattered gamma rays.

In this aspect of the invention the source holder and the photodetection means may be cylindrically symmetric and aligned along a common cylindrical axis.

BRIEF DESCRIPTION OF THE DRAWINGS

The method and apparatus for measuring ice thickness on an outer surface of a substrate in accordance with the present invention will now be described, by way of example only, reference being had to the accompanying drawings, in which.

DETAILED DESCRIPTION OF THE INVENTION

A) BASIC CONFIGURATION OF SOURCE-DETECTOR-TARGET SYSTEM

Figure 1:
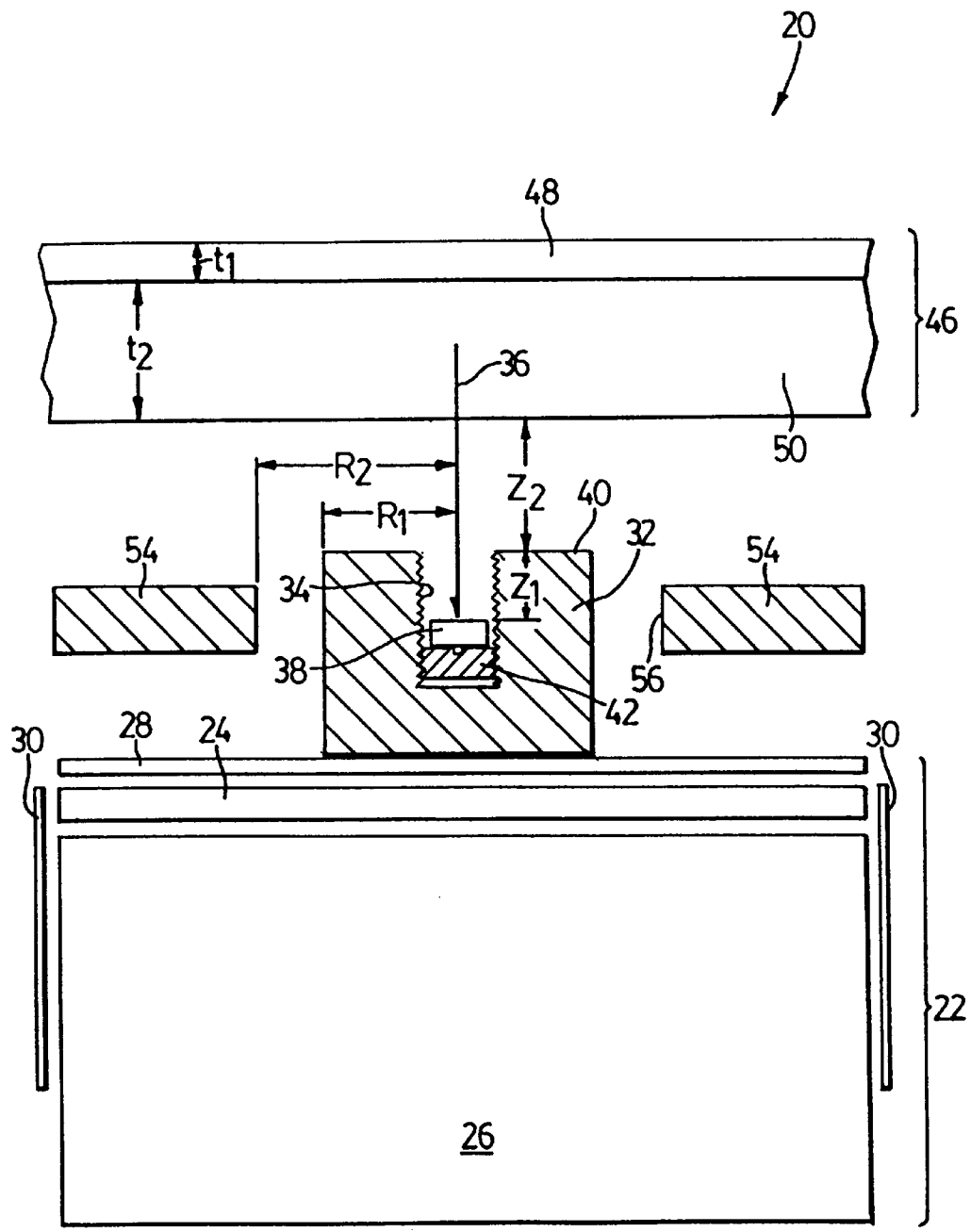
FIG. 1 is a longitudinal section of a radioactive source, holder and detector for measuring thicknesses of layers on substrates according to the present invention.

The basic design and geometric arrangement of an axially or cylindrically symmetric detector-source geometry constructed in accordance with an aspect of the present invention will be discussed first followed by descriptions of preferred embodiments for the monitoring of ice thickness on the airfoil of aircraft. The preferred embodiments of this invention illustrated in the drawings are not intended to be exhaustive or to limit the invention to the precise form disclosed so that the applications cited are exemplary in nature and are not intended to limit the scope of the invention.

Referring to FIG. 1, a longitudinal section of a detector-source-target arrangement constructed in accordance with the present invention is shown at 20. A scintillation detector 22 includes a thin (1.0 mm) NaI(Tl) scintillator 24 housed in an aluminum cylinder (not shown) of 5.08 cm external diameter and 15.24 cm in length which also houses a photomultiplier 26. A protective covering 28 such as MYLAR extends across the scintillator. A lead shielding 30 is provided around the sides of detector 22 to minimize multiple scattering from nearby objects.

A source holder 32 is provided with a longitudinal cavity 34 extending partly therethrough for holding a radioactive source 38. Holder 32 is shown as being tubular with a radius $R_1$ and cavity 34 defines a detector axis 36. Holder 32, also referred to as an absorber post, is fabricated of a sufficiently thick and dense material so that primary radiation from source 38 is blocked or absorbed before hitting detector 22 below the source.

Radioactive source 38 is preferably a commercially available sealed source of y-rays typically 3.0 mm in length and diameter. Source 38 sits on a threaded stud 42 for changing the position of source 38 in cavity 34. Source 38 sits at an adjustable depth $Z_1$ below the top surface 40 of holder 32. The cylindrically symmetric geometry and structure of holder 32 are such that with a source 38 in the holder, the axially symmetric beam of primary radiation moves upwards in a cone whose half angle is adjustable by the depth $Z_1$. The area of a target 46 (airfoil 50 and ice layer 48) spaced a distance $Z_2$ from surface 40 irradiated by the source is determined by both the half angle and the spacing $Z_1$.

The diameter of source holder 32 may vary from about 5 mm to about 8 mm and the holder may be fabricated of gold or other suitable high density material depending on the application. For example, platinum, tungsten, silver, molybdenum, lead and tantalum may all be used as materials for the source holder. The detector assembly may optionally include an iris 54 defining an aperture 56 and having an inner radius $R_2$ symmetrically disposed with respect to source holder 32. Iris 54 is formed of a material which acts to absorb x-rays and y-rays. Therefore, the backscattered photons can reach detector 22 only by passing through the annulus defined by radius $R_1$ of the source holder and $R_2$ of iris 54. Holder 32 blocks primary radiation from the source impinging on the detector. Iris 54 is optional since holder 32 is preferably made of a material having an effective density and shape to substantially block photons from the source from impinging on the photodetector and so is not required for some applications described herein.

The variables of the detector-source-target system include the dimensions $R_1$, $R_2$, $Z_1$, $Z_2$, the presence or absence of iris 54 and the choice of radioactive source.

B) MEASUREMENT OF ICE THICKNESS ON AIRCRAFT USING GAMMA-RAY BACKSCATTERING

To monitor ice buildup on an airfoil, one or more probes containing a y-ray source are installed on the inside of the leading edges along the aircraft wing or tail section with the probe containing a photodetector to measure y-ray backscattering from ice forming on the outer surface. The fixed installations may be adapted to produce data continuously on the status of ice forming on the wings of the aircraft which can be displayed on the flight deck.

Figure 2:
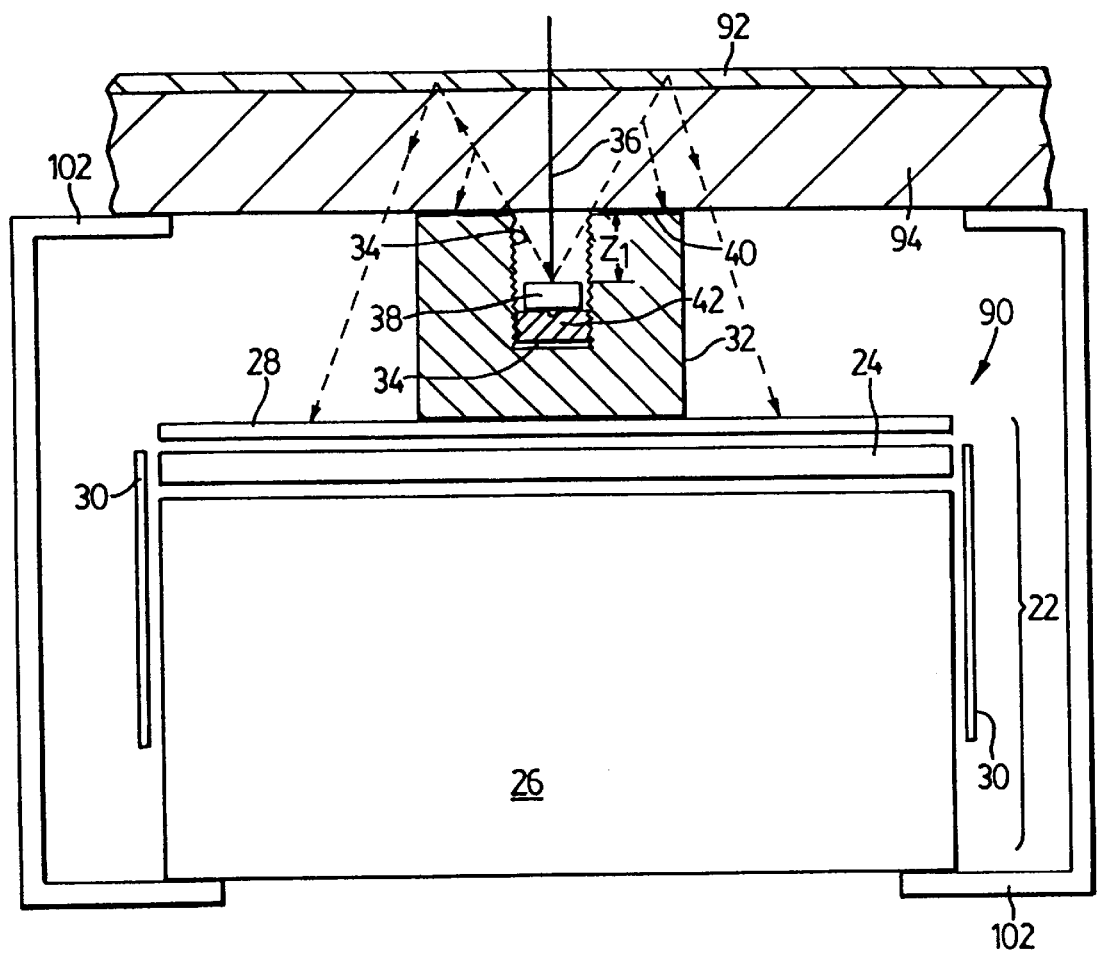
FIG. 2 is a longitudinal section of a probe for measuring ice thickness incorporating the device of FIG. 1 affixed to the inner surface of airfoil for measuring the buildup of ice on an outer surface of the airfoil substrate.

Referring to FIG. 2, an ice thickness monitoring probe shown generally at 90 is adapted to be secured to an inner surface 96 of an airfoil 94 ($Z_2$ in FIG. 1 is small or close to zero) for measuring ice thickness of an ice layer 92 on the outer surface of airfoil 94. Airfoil means aircraft parts with curved or flat surfaces such as the wings or other components, such as the tailplane, responsible for keeping the aircraft aloft during flight. To use the method of the present invention specifically to measure ice thickness on an airfoil or leading edges of the aircraft, the source and detector must not be located on the exterior of the airfoil for aerodynamic considerations. Aluminum, or rather aluminum based alloys, are currently the preferred material of construction of airfoils.

A radioactive source producing primary photons with sufficient energy to penetrate the aluminum is required and the geometry and density of the source holder is chosen so that photons backscattered in a preselected volume of the airfoil substrate adjacent to the source holder 32 are substantially blocked or attenuated by the holder and thereby prevented from impinging on detector 22, see broken lines in FIG. 2. Probe 90 preferably comprises an $^{241}$Am radioactive source 38 which produces y-rays of energy 60 keV. The backscattered secondary photons, which are reduced in energy to about 48 keV by Compton scattering, are also energetic enough to penetrate back through the aluminum to impinge on detector 22. Holder 32 has an effective density and shape to substantially block or attenuate primary photons directly from source 98 and backscattered from the aluminum from impinging on photodetector 22. Probe 90 abuts against inner surface 96 of airfoil 94 with surface 40 of holder 32 preferably abutting the inner surface to ensure most of the photons backscattered in the aluminum are blocked or attenuated in source holder 32 while photons backscattered in ice layer 92 reach detector 22. Brackets 102 or other attachment means may be used to secure probe 90 to the interior of the airfoil. Tubular or cylindrically shaped source holders made of gold, tantalum and molybdenum and the like having a radius in the range from about 5 mm to about 8 mm provide suitable results.

Figure 3:
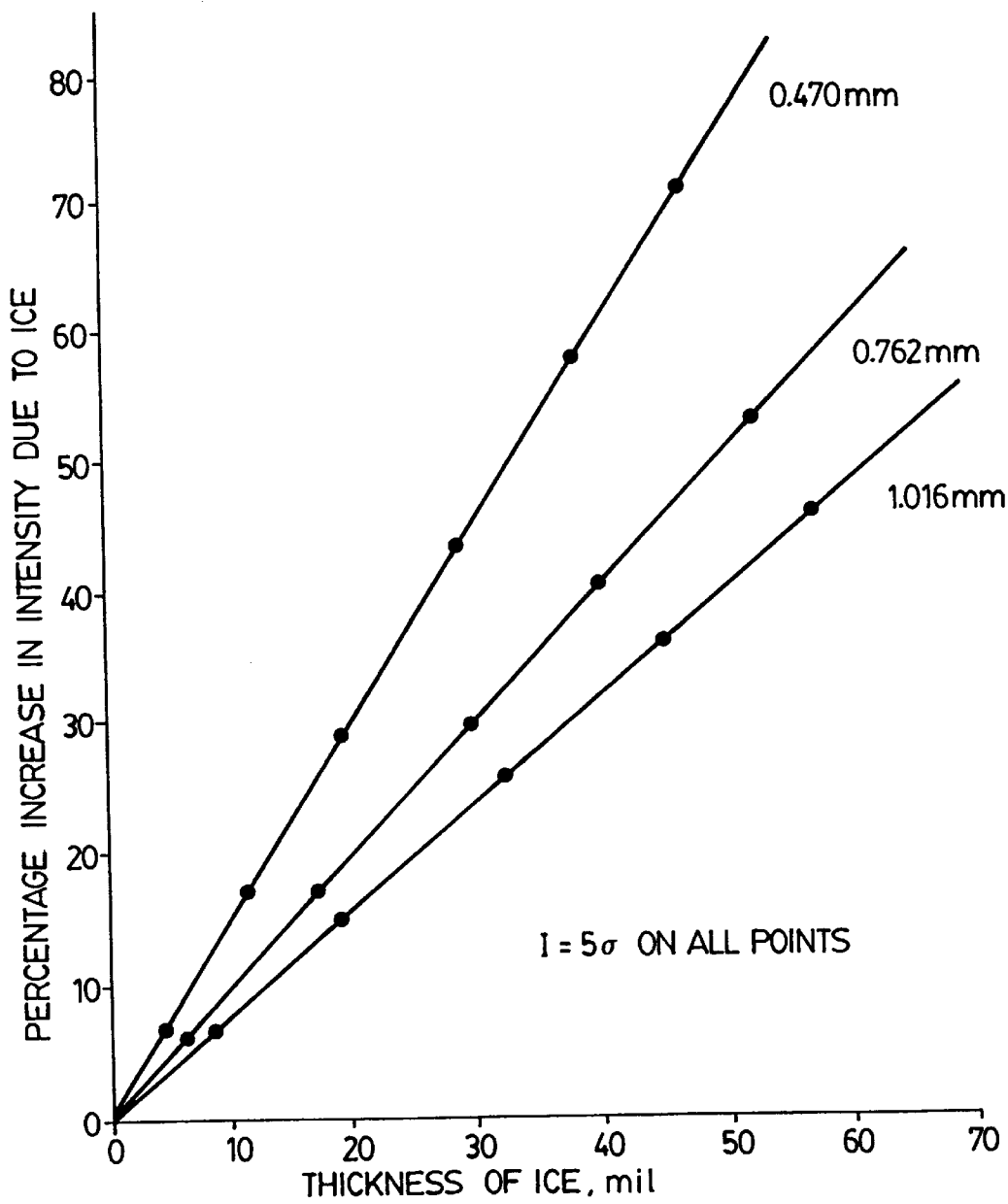
FIG. 3 illustrates the dependence of intensity of y ray backscattering on the thickness of the ice layer built-up on an aluminum alloy used for aircraft wings for three different aluminum alloy thicknesses.

FIG. 3 shows the results of backscattering of 60 keV y-rays from a flat sheet of aluminum placed 3.6 mm from the y-ray source. With a $^{241}$Am source strength of 200 microcuries (Isotope Developments Laboratory), the backscattered intensity from the aluminum was 139 kilocounts per minute (kcpm) for 1.016 mm aluminum; 112 kcpm for 0.762 mm thick aluminum and 76 kcpm for 0.47 mm thick aluminum. Ice was simulated by placing thin sheets of plastic on the side of the aluminum opposite the side on which the source was located. The readings were converted to show ice on the x- and y-axis of FIG. 3. The intensity of backscattering is expressed as a percentage increase above the thickness reading for aluminum alone. The increase is linear in the thickness of plastic for each thickness of aluminum. Radioactive source strengths in the range from about 1 microcuries to about 1 millicurie are preferred but the higher source strengths provide faster measurement times.

In addition to aluminum based alloys, airfoils may also be constructed from titanium or carbon based composites. For titanium airfoil of substantially the same areal density as the aluminum airfoil it is contemplated that the same sensitivity to build-up of ice will be achieved using the probe of FIG. 2. The inventor contemplates that for practical airfoil materials of any type, the present method can be used in situations in which the substrate is a laminar structure comprising more than one material as long as both materials can be penetrated by the y-rays and backscattered secondary photons.

The present method for detecting ice buildup on metal surfaces does not depend per se on any properties of ice; it merely detects the additional low-Z material adhering to the outer surface of the wing. Therefore, those skilled in the art will appreciate that the sensors used on aircraft must be strategically located on the airfoil to give the best results. In addition, the backscatter intensity is sensitive to changes in geometry so that small distortions due to aerodynamic forces may cause a change in background signal for an aircraft on the ground and in the air so that airborne calibration may be required. A plurality of probes are preferably used since the ice in many circumstances may not form a uniform continuous layer across the airfoil. With measurement times of seconds (depending on the source strength) the present method is an in situ technique so that the ice layer can be detected and its thickness determined while it is forming as well as after it has formed. The present device works with the same efficiency from −40 C. to +40 C.

Figure 4:
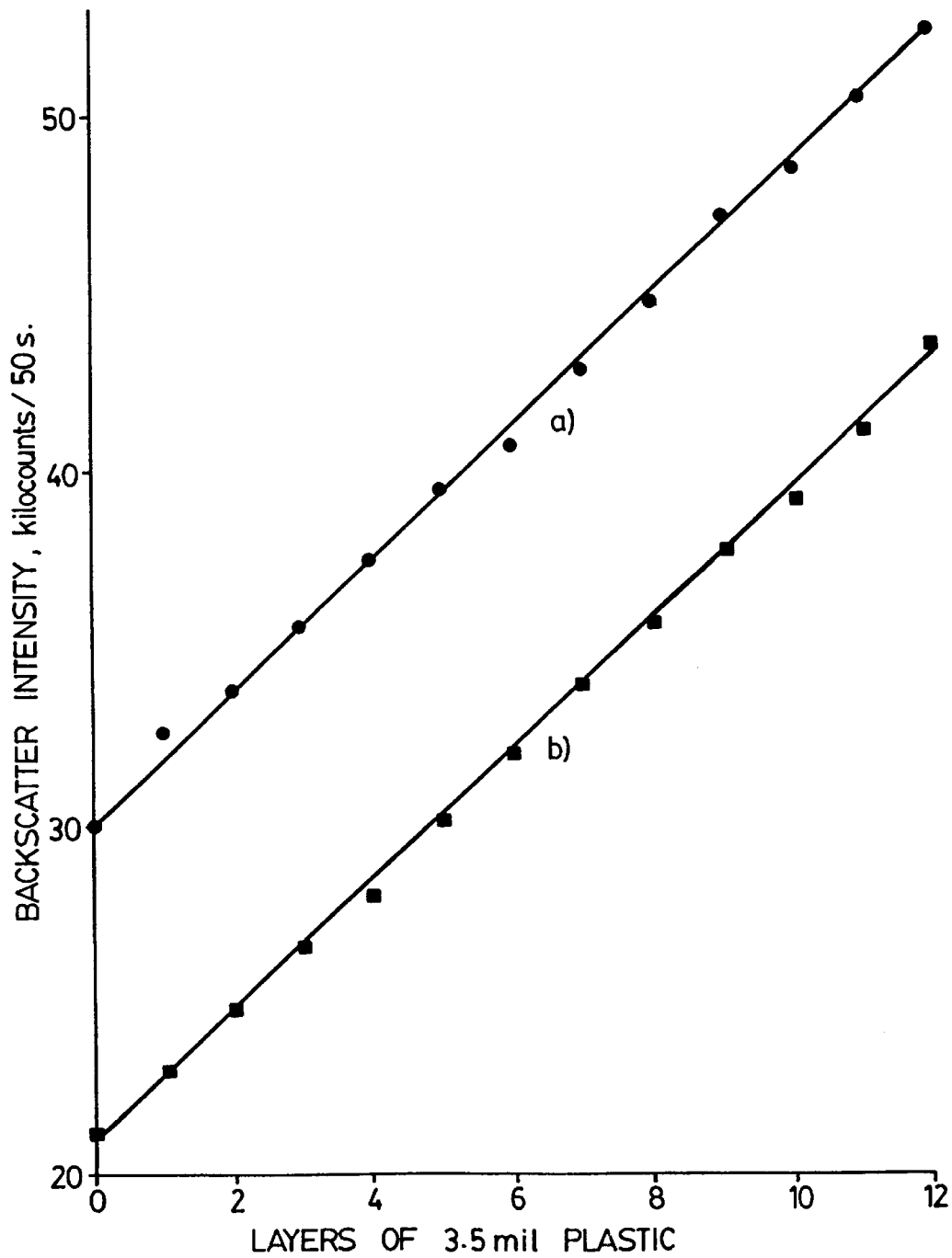
FIG. 4 shows the measured intensity of backscattered 60 keV y-rays as a function of the thickness of plastic pseudo ice overlying 5052 aluminum alloy of 0.762 mm thickness in plot (a) and 0.559 mm in plot (b) wherein each layer of plastic corresponds to 0.147 mm of ice.

Referring to FIG. 4, in another set of studies, the source and detector assembly was fixed 4 mm from two sheets of 5052 aluminum alloy, (a) 0.762 mm and (b) 0.559 mm. The intensity of backscattered y-rays was measured as layers of plastic were firmly secured to the aluminum. Each plastic layer had a thickness of 0.089 mm, equivalent to 0.147 mm of ice. The backscattering results are displayed in FIG. 5. The results of FIG. 4 show that in the absence of ice on the substrate surface a signal due to gamma ray backscattering in the substrate itself is detected. It is noted that while the present method uses a geometry which blocks most of the counts arising due to backscattering in the substrate rather than in the ice, some background signal is inevitable but it may be used to good advantage. Specifically, the intensity of this background signal can serve as a reassuring monitor to the crew of the aircraft. It should have a constant non-zero value that ensures that the ice detector is operating properly in the absence of ice. The background signal count would be subtracted from the total number of counts in the presence of ice to give the ice thickness. It should be understood that this background count is still significantly lower than would be obtained with a system not using shadowing to block most of the background signal. Nevertheless, the background signal should not be made so small that its statistical scatter would cause uncertainty as to whether the ice detector is functioning normally or not.

Figure 5:
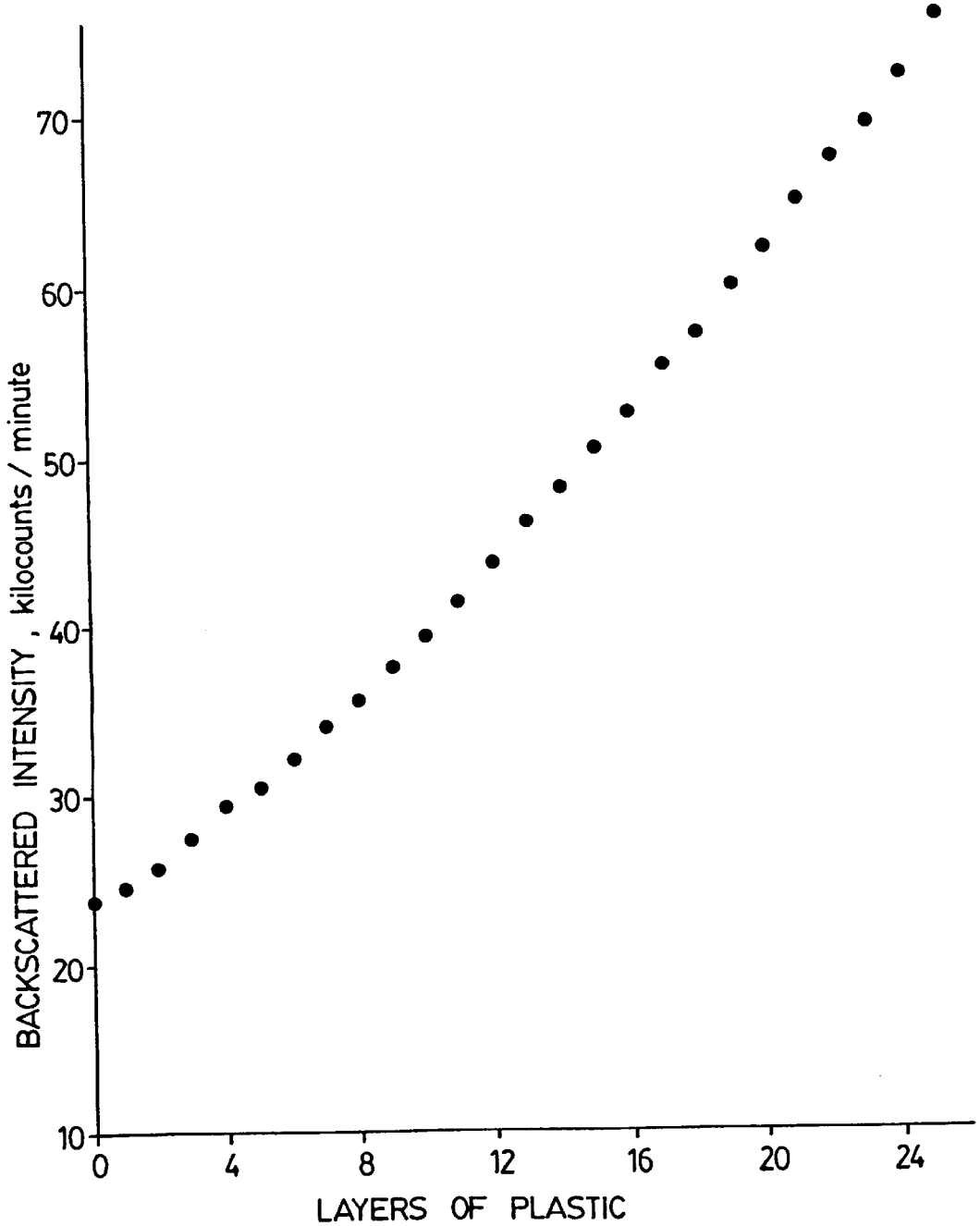
FIG. 5 shows the measured intensity of backscattered 60 keV gamma-rays as a function of the thickness of plastic backing overlying 6061 aluminum alloy of 2.223 mm thickness wherein each layer of plastic corresponds to 0.147 mm of ice.

FIG. 5 shows the backscatter intensity of 60 keV photons as a function of thickness of the plastic sheets (emulating ice) on a sheet of 6061 aluminum alloy with a thickness of 2.223 mm. In this configuration the source/detector array was bolted directly to the aluminum substrate metal in order to eliminate relative motion between the source and substrate.

In another study a uniform layer of water was frozen on one side of a sheet of 5052 aluminum alloy of thickness 0.559 mm. The ice thickness was calculated by weighing the aluminum substrate with and without ice and measuring the surface area. The ice thickness was then measured using the present method. The summary of the results are:

| Calculated Ice Thickness | Measured Thickness | % Error |
| --- | --- | --- |
| 51.0 mils | 53.4 mils | 4.7% |
| 30.9 mils | 33.1 mils | 7.1% |

Figure 6:
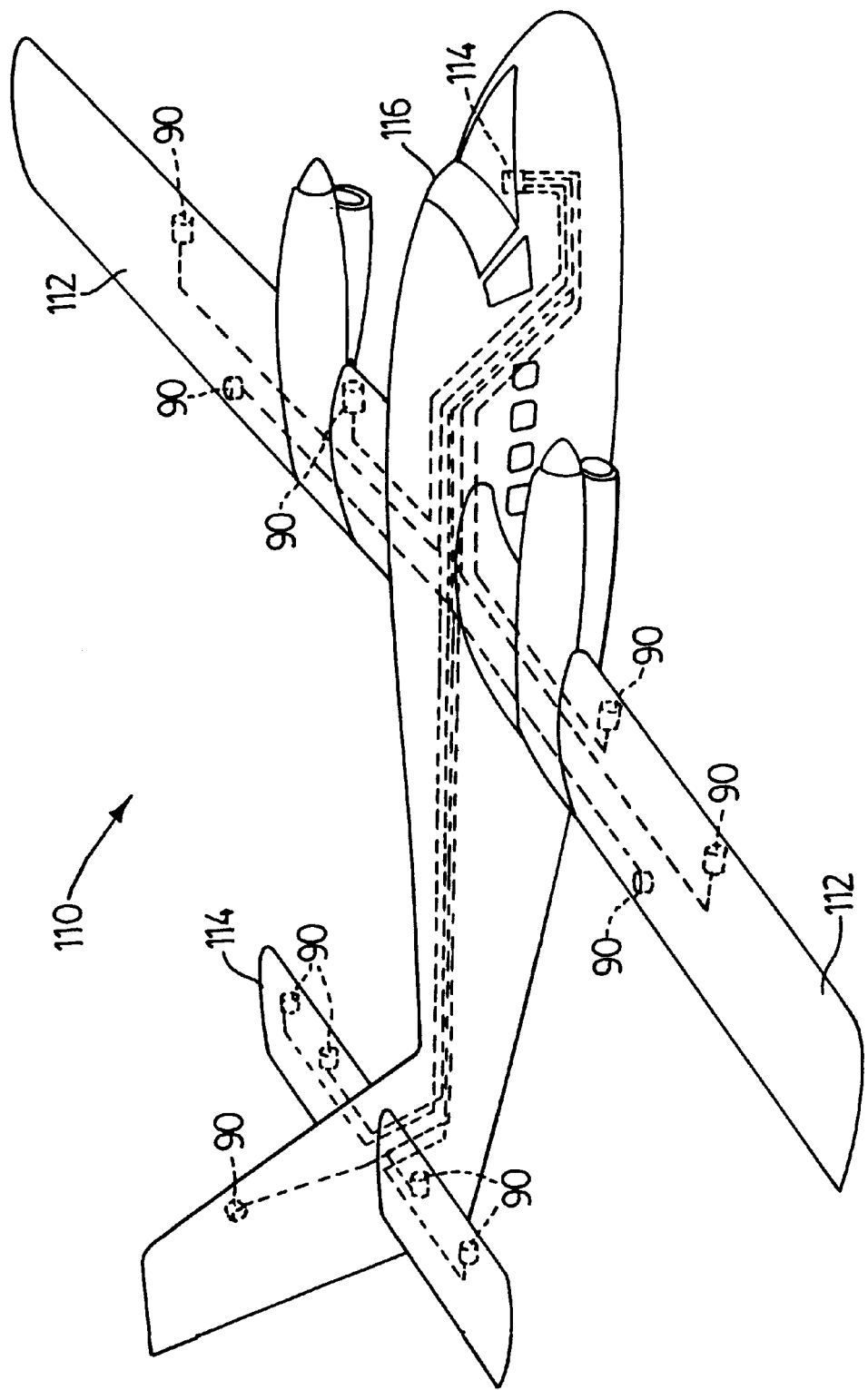
FIG. 6 illustrates the use of a plurality of the devices of FIG. 2 to measure the thickness of ice on the airfoil of an aircraft.

FIG. 6 illustrates an aircraft 110 in which a plurality of probes 90 are disposed along the interior of the leading edges of the wings 112 and tail stabilizers 114. Outputs from each probe 90 are input into a microprocessor 116 located on the flight deck 118 for displaying the outputs to the flight crew. The method disclosed herein of monitoring ice thickness on aircraft is advantageous over prior art methods because it does not require drilling holes in the wing thereby avoiding aerodynamic problems associated with interference of air flow over the wing and weakening of the airfoil. Further, the use of the weak radioactive sources provides a very rapid measurement while at the same time it avoids the need for expensive RF or microwave generators.

The present invention is very advantageous over the previous methods of ice thickness detection for several reasons. For example, the present method and device requires only a very weak radioactive source (sub-microcurries levels) which is a significant advance over GB 1385279 because in the latter the very low efficiency of the Geiger detector for 48 keV gamma rays means that radioactive sources with much stronger source strengths are required and hence the detectors require much more extensive shielding to prevent a large background arising from direct penetration of 60 keV primary photons to the detector.

Further, the present method and device shields the detector from secondary photons scattered in the airfoil itself while GB 1385279 is not designed to screen out counts due to scattering in the aluminum airfoil. In addition, because the present system has substantially no interfering background i.e. all the pulses are desired signals in that they lie in the pulse height range for backscattered 60 Kev photons, it is unaffected by changes in gain induced by changes in ambient temperature. This is achieved using for example commercial counting systems comprising a single-channel analyzer having two adjustments, the threshold and the window width. These adjustments are set by the manufacturer so that all pulses of backscattered 60 keV photons lie within the range (i.e. window) defined by these variables. The present device works with the same efficiency from −40 C. to +40 C. Geiger counters on the other hand contain gas mixtures which may condense at extremely low temperatures with a resultant change in the intensity of spurious after-pulses due to failure in self-quenching.

Another advantage of the present invention relates to the fact that the gamma ray backscattering method may be used to measure the rate of ice build-up in addition to the presence of ice. The ability of the aircrew to monitor the rate of ice build-up is very advantageous since it provides them the opportunity to take evasive action such as changing course or altitude to minimize the danger of icing. For measurement of rate of ice buildup, a higher counting rate and hence stronger source is preferred to ensure adequate statistical precision in the rate of ice build-up; this rate is the time derivative of the ice accumulation and hence shows more statistical scatter. For measurement of ice thickness, the source strength may vary over several orders of magnitude depending on the time constraints required for making measurements. Thus, where very rapid measurements (on the time scale of seconds) are desired source strengths of the order of millicuries are preferred and where longer times are acceptable source strengths as low as microcuries may be used.

Those skilled in the art will appreciate that the present invention advantageously uses hindrance to selectively sample backscattered photons to ensure photons backscattered from the layer of interest are probed. This use of hindrance can include a) absorption by the specimen; 2) blocking or shadowing by the radioactive source holder and the iris to block secondary radiation arising from scattering in the body of the airfoil itself from reaching the detector; and 3) collimation of the primary photon beam by varying the position of the source in the source holder.

The method disclosed herein is very advantageous for detecting the presence, and measuring the thickness, of ice buildup on an airfoil using relatively simple and inexpensive photodetectors and commercially available counting electronics. The thickness of the ice layer can be measured very rapidly with the measurement time dependent on the radioactive source strength.

Therefore, while the present invention has been described and illustrated with respect to the preferred embodiments for measuring the thickness of ice buildup on substrate surfaces such as an outer surface of an airfoil, it will be appreciated that numerous variations of these embodiments may be made depending on the application without departing from the scope of the invention as described herein.

Therefore what is claimed is:

1. A method for measuring ice buildup on an outer surface of a substrate, comprising:

providing a gamma ray source in a source holder, the gamma ray source producing a beam of primary gamma rays having sufficient energy to penetrate through said substrate;

providing a photodetection means behind said source holder and positioning said source holder adjacent to an inner surface of said substrate so that the beam of primary gamma rays are directed through said substrate away from the photodetection means, wherein the source holder shields said photodetection means from primary gamma rays from the gamma ray source and shields said photodetection means from at least some of the gamma rays scattered in said substrate; and measuring an intensity of backscattered gamma rays at said photodetection means and determining from said intensity of gamma rays a thickness of ice buildup on said outer surface of said substrate.

2. The method according to claim 1 wherein the step of determining a thickness of ice buildup includes measuring a background intensity of gamma rays measured by said photodetection means from an ice-free substrate and subtracting said background intensity from said intensity of gamma rays.

3. The method according to claim 2 wherein the step of providing a gamma ray source in a source holder includes providing a cylindrically symmetric source holder to provide an axially symmetric beam of primary gamma rays emerging from said source holder.

4. The method according to claim 3 wherein the gamma ray source is radioactive $^{241}$Am.

5. The method according to claim 4 wherein the step of measuring the intensity of backscattered gamma rays includes measuring said intensity with a NaI(Tl) X-ray scintillator coupled with a photomultiplier detector.

6. The method according to claim 5 including adjusting the position of the radioactive source in the source holder to control collimation of the beam of primary gamma rays.

7. The method according to claim 1 including measuring a rate of ice buildup on said substrate.

8. An apparatus for measuring an ice layer buildup on an outer surface of an airfoil, comprising:

a) at least one probe mounted on an interior surface of an airfoil, said at least one probe including a source holder containing a source of gamma rays having energies sufficiently high to penetrate through said airfoil, a photodetection means located behind said source holder for measuring an intensity of backscattered photons, the photodetection means being positioned with respect to said source holder so that said source holder blocks primary gamma rays from said source from impinging on said photodetection means and shields said photodetection means from at least some secondary gamma rays backscattered in said airfoil, and wherein gamma rays emerging from said source holder are directed away from said photodetection means; and b) processing means connected to said photodetection means for calculating a thickness of an ice layer from said intensity of backscattered gamma rays.

9. The apparatus according to claim 8 wherein said source holder and said photodetection means are cylindrically symmetric and are aligned along a common cylindrical axis.

10. The apparatus according to claim 9 wherein said photodetection means includes a cylindrical NaI(Tl) X-ray scintillator having a front face, said source holder being mounted on said front face.

11. The apparatus according to claim 10 wherein said photodetection means includes a photomultiplier detector coupled with said NaI(Tl) X-ray scintillator.

12. The apparatus according to claim 11 wherein the source holder includes a cylindrical post constructed of a metal selected from the group consisting of molybdenum, gold, platinum, lead, silver, tantalum and tungsten and having dimensions suitable to block primary gamma rays from said source of gamma rays from impinging directly on said photodetection means.

13. The apparatus according to claim 12 wherein said cylindrical post has a preselected diameter so that said cylindrical post absorbs a portion of secondary photons scattered in said airfoil adjacent to said cylindrical post.

14. The apparatus according to claim 13 wherein the source of gamma rays is radioactive $^{241}$Am.

15. The apparatus according to claim 13 wherein said processing means is connected to a display means connected to each of said probes for displaying a thickness of an ice layer.

16. The apparatus according to claim 15 wherein said processing means is adapted to calculate a rate of ice buildup on said airfoil.

17. The apparatus according to claim 10 wherein the source of gamma rays is radioactive $^{241}$Am.

18. The apparatus according to claim 17 wherein said radioactive $^{241}$Am has a source strength in the range from about 1 microcurie to about 30 millicuries.

19. The apparatus according to claim 8 wherein the source holder includes a cylindrical post constructed of a metal selected from the group consisting of molybdenum, gold, platinum, lead, silver, tantalum and tungsten and having dimensions suitable to block primary gamma rays from said source of gamma rays from impinging directly on said photodetection means.

20. The apparatus according to claim 19 wherein said cylindrical post has a preselected diameter so that said cylindrical post absorbs a portion of secondary gamma rays scattered in said airfoil adjacent to said cylindrical post.

21. The apparatus according to claim 20 wherein the source holder includes adjustment means for adjusting the position of the source of gamma rays in the source holder to control collimation of a beam of primary gamma rays emerging from said source holder.

22. The apparatus according to claim 8 wherein said at least one probe is a plurality of probes each mounted at a different location on said airfoil.

23. The apparatus according to claim 22 wherein said processing means is connected to a display means connected to each of said probes for displaying a thickness of an ice layer.

24. The apparatus according to claim 8 wherein said processing means is adapted to calculate a rate of ice buildup on said airfoil.

* * * * *